United States Patent
Akaishi et al.

(10) Patent No.: US 8,791,681 B2
(45) Date of Patent: Jul. 29, 2014

(54) ELECTRIC POWER CONVERSION SYSTEM

(75) Inventors: Yoshio Akaishi, Hitachinaka (JP); Yasuo Noto, Hitachinaka (JP); Koichi Yahata, Hitachinaka (JP); Seiji Funaba, Hitachinaka (JP); Masashige Tsuji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 371 days.

(21) Appl. No.: 13/201,139

(22) PCT Filed: Feb. 19, 2010

(86) PCT No.: PCT/JP2010/052548
§ 371 (c)(1),
(2), (4) Date: Oct. 3, 2011

(87) PCT Pub. No.: WO2010/101032
PCT Pub. Date: Sep. 10, 2010

(65) Prior Publication Data
US 2012/0020136 A1   Jan. 26, 2012

(30) Foreign Application Priority Data

Mar. 3, 2009 (JP) ................................. 2009-048718

(51) Int. Cl.
*H02M 3/156* (2006.01)
(52) U.S. Cl.
USPC .............................. 323/288; 363/98; 320/166
(58) Field of Classification Search
USPC ...................... 323/283–288; 363/17, 98, 132; 320/133, 135, 166
See application file for complete search history.

(56) References Cited

U.S. PATENT DOCUMENTS 5,111,027 A * 5/1992 Fowler .......................... 219/506
5,619,107 A   4/1997 Shinohara et al.
(Continued)

FOREIGN PATENT DOCUMENTS

JP   4-127801 A   4/1992
JP   9-149508 A   6/1997
(Continued)

OTHER PUBLICATIONS

Japanese Office Action dated Sep. 11, 2012 including English-language translation (Six (6) pages).

(Continued)

*Primary Examiner* — Jessica Han
(74) *Attorney, Agent, or Firm* — Crowell & Moring LLP

(57) ABSTRACT

A power conversion system according to the present invention includes: an inverter circuit unit that converts a direct current power supplied from a direct current source into an alternating current power, the direct current power being supplied to the inverter circuit through a contactor that conducts and interrupts the direct current; a capacitor that smoothes the direct current power; a discharge circuit unit that is connected to the capacitor in parallel, and that includes a discharge resistor for discharging a charge stored in the capacitor and a switching element for the discharge resistor, being connected in series to the discharge resistor; a voltage detection circuit unit that detects voltage between both terminals of the capacitor; a first discharge control circuit that includes a first microcomputer, and that outputs a control signal to control switching of the switching element for discharging; and a second discharge control circuit that outputs an interruption signal to interrupt the switching element for the discharge resistor.

10 Claims, 10 Drawing Sheets

(56) References Cited

U.S. PATENT DOCUMENTS

| | | | | |
|---|---|---|---|---|
| 8,039,993 | B2* | 10/2011 | Kaplan | 307/98 |
| 2003/0023394 | A1* | 1/2003 | Bierl | 702/57 |
| 2005/0169018 | A1* | 8/2005 | Hatai et al. | 363/37 |
| 2009/0284199 | A1* | 11/2009 | Kitanaka | 318/400.24 |
| 2010/0045104 | A1 | 2/2010 | Hirasawa | |

FOREIGN PATENT DOCUMENTS

| | | |
|---|---|---|
| JP | 2000-78851 A | 3/2000 |
| JP | 2000-278802 A | 10/2000 |
| JP | 2004-7985 A | 1/2004 |
| JP | 2006-42459 A | 2/2006 |
| JP | 2006-246569 A | 9/2006 |
| JP | 2008-278560 A | 11/2008 |

OTHER PUBLICATIONS

European Search Report Dated Jun. 20, 2013 (Nine (9) pages).
International Search Report dated May 18, 2010 (two (2) Pages).

* cited by examiner (a)

(b)

(a)

(b)

ELECTRIC POWER CONVERSION SYSTEM

TECHNICAL FIELD

The present invention relates to a discharge control unit for discharging charges stored in a capacitor and a electric power conversion system equipped therewith.

BACKGROUND ART

An inverter that is used in an electric vehicle in many cases is equipped with a capacitor for smoothing direct current voltage of the main circuit. As a method for discharging charges stored in the capacitor that remains after the switch of the inverter is turned off, there is adopted a method of connecting a discharge resistor across both ends of the capacitor. However, this method leads to heat generation by the resistor due to continuously flowing current on the discharge resistor, and also leads to a deterioration of conversion efficiency of the inverter. Therefore, a method in which a switching element or the like is connected to the discharge resistor in series so that discharging can be started by switching the switching element to be conducting by a discharge command signal that is output only when discharge is required. For determining whether the discharge command signal should be output, a method of detecting a change in voltage across both ends of the capacitor with a differentiation circuit is used in the Patent Literature 1.

However, a further improvement of reliability of discharge control in an inverter device is desired.

CITATION LIST

Patent Literature

[Patent Literature 1] Japanese Patent Publication Laid-open No. 2006-42459

SUMMARY OF INVENTION

Technical Problem

A problem which the present invention is to solve is to improve reliability of discharge control in a discharge control device and a power conversion system using the same.

Solution to Problem

According to the first aspect of the present invention, a power conversion system comprises: an inverter circuit unit that converts a direct current power supplied from a direct current source into an alternating current power, the direct current power being supplied to the inverter circuit through a contactor that conducts and interrupts the direct current; a capacitor that smoothes the direct current power; a discharge circuit unit that is connected to the capacitor in parallel, and that includes a discharge resistor for discharging a charge stored in the capacitor and a switching element for the discharge resistor, being connected in series to the discharge resistor; a voltage detection circuit unit that detects voltage between both terminals of the capacitor; a first discharge control circuit that includes a first microcomputer, and that outputs a control signal to control switching of the switching element for discharging; and a second discharge control circuit that outputs an interruption signal to interrupt the switching element for the discharge resistor.

According to the 2nd aspect of the present invention, in a power conversion system according to the 1st aspect, it is preferred that the first discharge control circuit outputs the control signal to controls switching of the switching element for discharging, based on a voltage value detected by the voltage detection circuit unit and on a switch signal for the contactor output from an external upper controller.

According to the 3rd aspect of the present invention, in a power conversion system according to the 1st aspect, it is preferred that the first discharge control circuit receives a discharge signal to start discharging output from an external upper controller, and outputs the control signal to control switching of the switching element for discharging, based on the discharge signal and the voltage value.

According to the 4th aspect of the present invention, in a power conversion system according to the 1st aspect, it is preferred that the first discharge control circuit outputs the control signal to control switching of the switching element for discharging based on the discharge signal detected by the voltage detection circuit unit and a discharge signal to start discharging output from an external upper controller, and the second discharge control circuit outputs, based on the control signal, a conduction command signal to achieve conduction of the switching element for the discharge resistor for a predetermined period and an interruption command signal to interrupt the switching element for the discharge resistor after the conduction for the predetermined period.

According to the 5th aspect of the present invention, in a power conversion system according to any one of the 1st to the 4th aspects, it is preferred that the control signal output by the first discharge control circuit is a control signal that has a rising edge and a falling edge, and the second discharge control circuit outputs the conduction command signal or the interruption command signal corresponding to the rising edge and the falling edge, respectively.

According to the 6th aspect of the present invention, in a power conversion system according to any one of the 1st to the 4th aspects, it is preferred that the control signal output by the first discharge control circuit is a control signal that has a high level signal and a low level signal, and the second discharge control circuit outputs the conduction command signal or the interruption command signal corresponding to the high level signal and the low level signal, respectively.

According to the 7th aspect of the present invention, in a power conversion system according to the 1st aspect, it is preferred that the first discharge control circuit and the second discharge control circuit are insulated from each other with an insulated transmission element.

According to the 8th aspect of the present invention, in a power conversion system according to the 1st aspect, it is preferred that the second discharge control circuit includes a circuit equipped with a second microcomputer.

According to the 9th aspect of the present invention, in a power conversion system according to the 1st aspect, it is preferred that the second discharge control circuit includes a circuit equipped with a one-shot circuit.

According to the 10th aspect of the present invention, in a power conversion system according to the 7th or 8th aspect, it is preferred that the second discharge control circuit controls a pulse width of the control signal generated by the first discharge control circuit and a pulse width of a second control signal generated by the second discharge control circuit.

According to the 11th aspect of the present invention, in a power conversion system according to the 1st aspect, it is preferred that the power conversion system further comprises: an informing circuit that is connected to the capacitor in parallel and that informs whether charges stored in the capacitor have been discharged.

According to the 12th aspect of the present invention, in a power conversion system according to the 10th aspect, it is preferred that the power conversion system further comprises: a direct current source terminal that is supplied with direct current power from the direct current source and supplies the direct current power to the inverter circuit unit; and an alternating current output terminal that is supplied with the alternating current power from the inverter circuit unit, wherein the informing circuit includes a light emitting device and arranged on a side that is closer to the direct current source terminal than the alternating current output terminal.

According to the 13th aspect of the present invention, a discharge control device comprises: a discharge resistor that is electrically connected to a capacitor that smoothes current or voltage input to an inverter circuit unit; a discharge circuit unit including a switching circuit connected to the discharge resistor in series; a microcomputer that outputs a first pulse to control whether a charge stored in the capacitor is discharged to the discharge circuit unit; and a pulse generation circuit unit that generates a second pulse having a predetermined pulse width based on rising or falling or both of the first pulse, wherein the switching circuit is controlled such that discharging of the charges stored in the capacitor to the discharge resistor is stopped based on output of the second pulse.

Advantageous Effects of Invention

With the power conversion system according to the present invention, discharging of the capacitor can be stopped by the second discharge control circuit even when the contactor or the first discharge control circuit is in failure, so that the reliability of discharge control in the power conversion system can be improved. Even when the microcomputer or the like is in failure, discharging of the capacitor can be stopped by the pulse generation circuit unit, so that the reliability of discharge control can be increased. According to the present invention, these can improve the reliability of the discharge control device and the power conversion system using the same.

DESCRIPTION OF EMBODIMENTS

Figure 1:
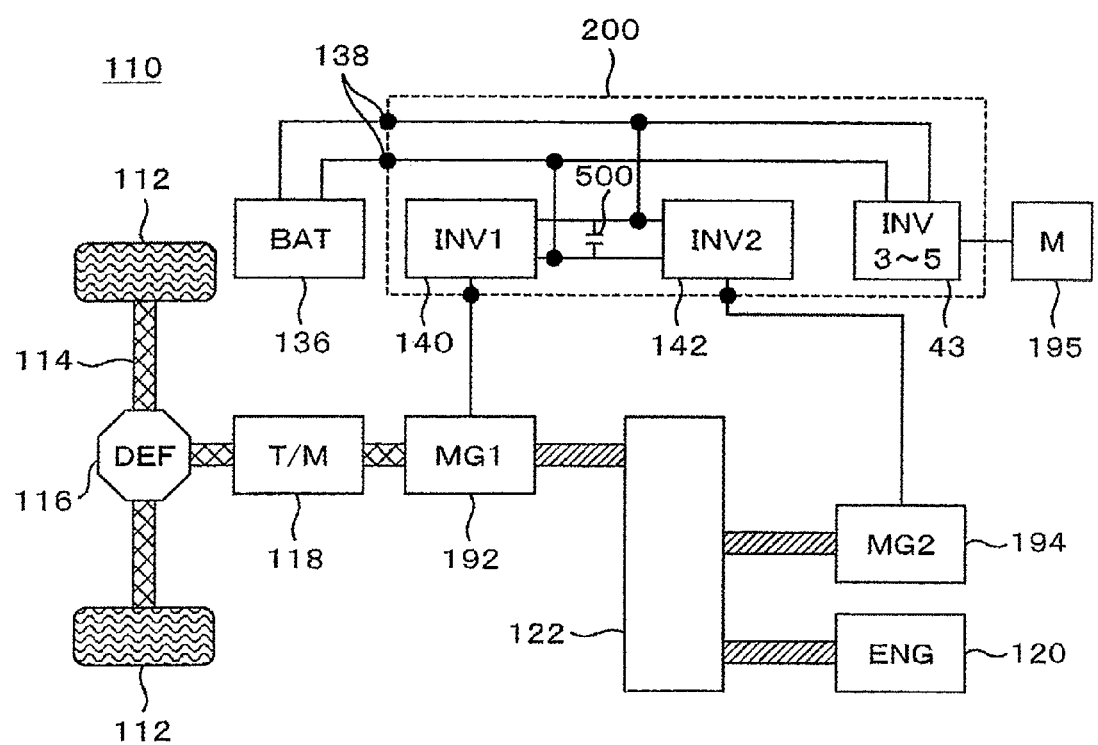
FIG. 1 presents a control block diagram for a hybrid vehicle in which the electric power conversion system according to an embodiment of the present invention is applied.
Figure 2:
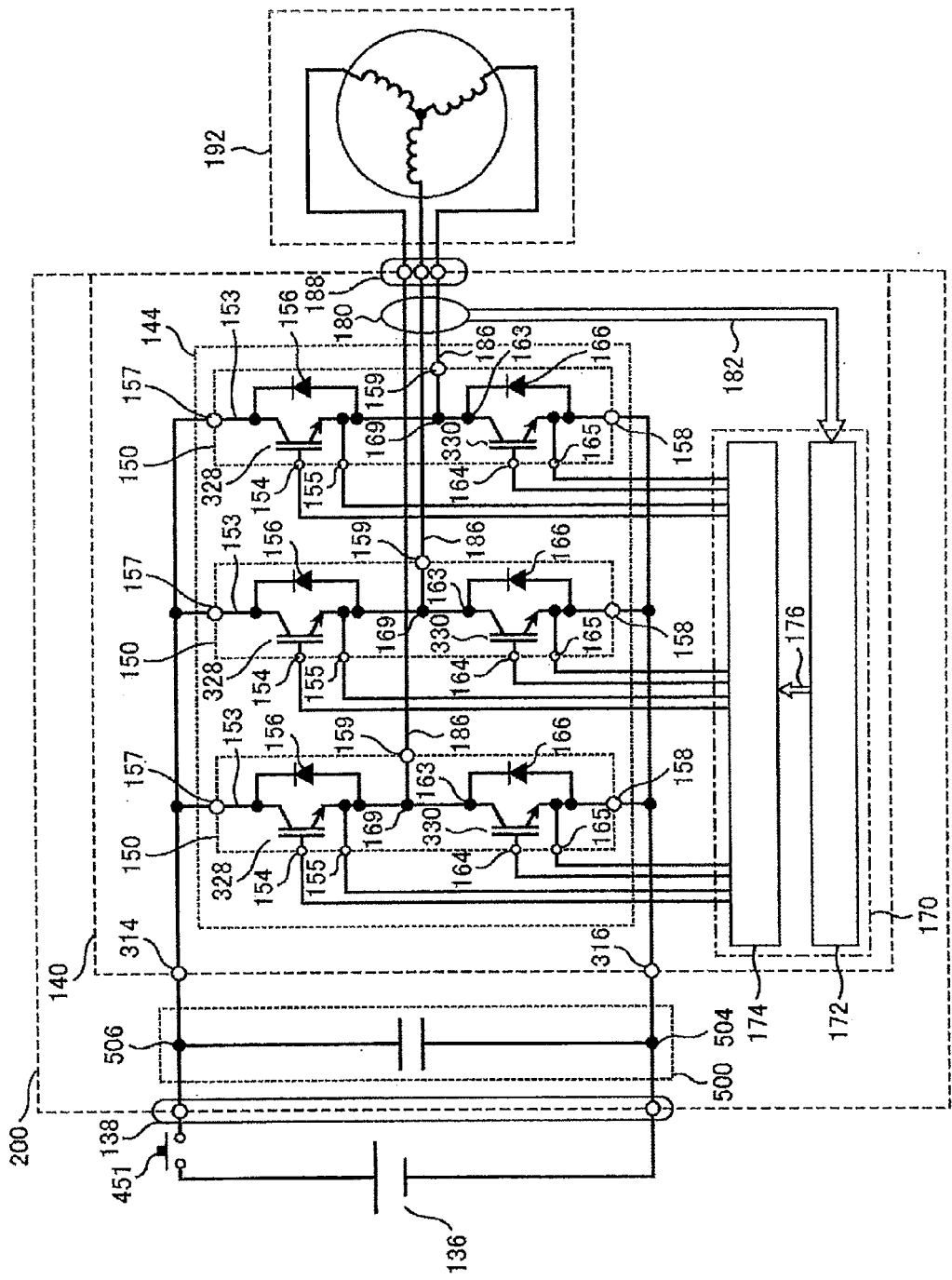
FIG. 2 presents an electric circuit diagram of the electric conversion system according to an embodiment of the present invention.

Hereafter, the electric power conversion system according to an embodiment of the present invention will be described in detail with reference to the attached drawings. The electric power conversion system according to an embodiment of the present invention is applicable to hybrid vehicles and pure electric vehicles. Control construction and circuitry of the electric power conversion system in case of a power conversion system according to an embodiment of the present invention is applied to a hybrid automobile are explained with reference to FIGS. 1 and 2. FIG. 1 presents a block diagram for controlling of a hybrid vehicle.

The electric power conversion system according to one embodiment of the present invention is explained by taking an example of an electric power conversion system equipped to an automobile, in particular an inverter device for an electrical machinery system that is equipped to an automobile, and in particular one that is used for an electrical machinery system for driving a vehicle in very severe environments of equipment and operation. An inverter for driving a vehicle on the one hand, which is provided in an electrical machinery system for driving a vehicle as a controller that controls driving of a motor for driving the vehicle, converts DC power supplied from an onboard battery or an onboard electricity generation device into predetermined AC power, and supplies this AC power to an AC electric motor for driving the vehicle. On the other hand, the motor for driving a vehicle has a function of an electricity generator and performs the inverse conversion of AC power generated by the AC electric motor for driving the vehicle into DC power. The converted DC power is supplied to the on-board battery.

The construction of the present embodiment is most suitable as an electric power conversion system for driving a vehicle such as an automobile, a truck or the like.

Referring to FIG. 1, a hybrid electric vehicle 110 (hereinafter termed a "HEV") is a kind of electrically powered vehicle that is equipped with two vehicle drive systems. One of these is an engine system that utilizes an internal combustion engine (ENG) 120 as a drive source. This engine system is principally used as a source of drive power for the HEV 110. The other drive system is an in-vehicle electrical machine system that utilizes motor-generators 192 and 194 (MG1 and MG2) as sources of drive force. The in-vehicle electrical machine system is principally used as a source of drive force for the HEV 110 and as a power generation source for the HEV 110. The motor-generators 192 and 194 may, for example, be synchronous motors or induction motors, and here they will be referred to as motor-generators, since, depending on the operation mode, they respectively can operate either as a motor or as a generator.

Front wheel shafts 114 are rotatably supported at the front portion of the body of the vehicle, and a pair of front wheels 112 is provided upon the ends of these front wheel shafts 114. Moreover, a pair of rear wheel shafts (not shown) is rotatably supported at the rear portion of the vehicle body, and a pair of rear wheels (also not shown) is provided upon the ends of these rear wheel shafts. While, with the HEV 110 of this embodiment, the so-called front wheel drive configuration is employed in which the main wheels that are powered by drive force are the front wheels 112, and the trailing wheels that free-wheel are the rear wheels (not shown), the present invention could also be applied to the reverse configuration, i.e. to a HEV that employs the rear wheel drive configuration.

A front wheel side differential gear system 116 (hereinafter termed the "front wheel differential (DEF)") is provided at the central portion between the two front wheel shafts 114. The front wheel shafts 114 are mechanically connected to the output sides of this front wheel differential 116. Furthermore, the output shaft of a transmission 118 is mechanically connected to the input side of the front wheel differential 116. The front wheel differential (DEF) 116 is a differential type drive force distribution mechanism that distributes the rotational drive force that is transmitted and speed-changed through the transmission 118 to the left and right front wheel shafts 114. The output side of the motor-generator 192 is mechanically connected to the input side of the transmission 118. Furthermore, the output side of the engine 120 and the output side of the motor-generator 194 are mechanically connected to the input side of the motor-generator 192 via a drive force distribution mechanism 122. It should be understood that the motor-generators 192 and 194 and the drive force distribution mechanism 122 are stored in the interior of the casing 119 of the speed change mechanism 118.

The motor-generators 192 and 194 are synchronous motors whose rotor incorporate permanent magnets, with AC power supplied to the armature windings of a stator being controlled by inverter devices 140 and 142 (INV1 and INV2), and thereby drive control of the motor-generators 192 and 194 is performed. A battery (BAT) 136 is electrically connected to the inverter devices 140 and 142, so that transfer of power can be performed between the battery 136 and the inverter devices 140 and 142.

The HEV 110 of this first embodiment includes two motor-generator units, i.e. a first motor-generator unit that includes the motor-generator 192 and the inverter device 140, and a second motor-generator unit that includes the motor-generator 194 and the inverter device 142; and selection between these units is done according to the vehicle driving status. In other words, when the vehicle is being driven by the drive force from the engine 120, if the drive torque of the vehicle is to be assisted, the second motor-generator unit is operated as an electricity generation unit by the drive force from the engine 120, while the first motor-generator unit is operated as an electrically driven unit using the power that is generated in this way. Moreover, in a similar way, when the speed of the vehicle is to be assisted, the first motor-generator unit is operated as an electricity generation unit by the rotational force from the engine 120, while the second motor-generator unit is operated as an electrically driven unit using the power that is generated in this way.

Furthermore, with the HEV of this first embodiment, it is possible to operate the first electric drive/generator unit as an electrical drive unit using the power of the battery 136, so as to drive the vehicle only with the drive force of the motor-generator 192. Yet further, with the HEV of this first embodiment, it is possible to operate the first electric drive/generator unit or the second electric drive/generator unit as an electricity generation unit with the drive power from the engine 120, or with drive power from the vehicle wheels, so as to charge up the battery 136.

The battery 136 is also used as a power supply for driving auxiliary machinery motor 195. In such auxiliary machinery there may be incorporated, for example, a motor that drives a compressor for an air conditioner, or a motor that drives a hydraulic pump for control; DC power is supplied from the battery 136 to an inverter device 43, and is converted into AC power by the inverter device 43 and supplied to the motor 195.

This auxiliary machinery inverter device 43 is endowed with a function similar to that of the inverter devices 140 and 142 for driving the vehicle, and controls the phase, the frequency, and the power of the AC that it supplies to the motor 195. For example, the motor 195 generates torque due to AC power having a leading phase with respect to the rotation of the rotor of the motor 195 being supplied. Conversely, by AC power having a delayed phase being generated, the motor 195 operates as a generator, so that the motor 195 performs regenerative braking operation. The control function of this type for the inverter device 43 is the same as the control functions for the inverter devices 140 and 142. While the maximum conversion power of the inverter device 43 is smaller than those of the inverter devices 140 and 142 since the capacity of the motor 195 is smaller than the capacities of the motor-generators 192 and 194, the circuit structure of the inverter device 43 is fundamentally the same as the circuit structures of the inverter devices 140 and 142.

The inverter devices 140 and 142 and the inverter device 43 as well as a capacitor module 500 are in close electrical relationship with each other. Moreover these all have the common characteristic in regard to that they need countermeasures against generation of heat. Furthermore, it is desirable to make the volumes of the inverter devices as small as possible. From these points of view, in the power conversion device that is described in detail hereinafter, the inverter devices 140 and 142, the inverter device 43, and the capacitor module 500 are housed within the chassis of the power conversion device. With this type of structure, it is possible to implement a device that is compact and whose reliability is high.

Furthermore, by housing the inverter devices 140 and 142, the inverter device 43, and the capacitor module 500 within a single chassis, the beneficial effects are obtained that it is possible to simplify the wiring and to implement countermeasures against noise. Yet further, it is possible to reduce the inductances of the connection circuitry between the capacitor module 500 and the inverter devices 140, 142, and the inverter device 43, and due to this not only is it possible to prevent the generation of spike voltage, but also it is possible to anticipate the reduction of heat generation and the enhancement of heat dissipation efficiency. The circuit structure of the inverter devices 140 and 142 and the inverter device 43 will be explained with reference to FIG. 2. Explanation is made taking examples in which the circuit structure of the inverter devices 140 and 142 and the inverter device 43 are separately constructed. Since each of the inverter devices 140, 142, and 43 has a similar circuit structure and a similar operation and function, here the inverter device 140 will be explained as a representative.

A power conversion device 200 includes the inverter device 140 and the capacitor module 500, and the inverter device 140 includes an inverter circuit 144 and a control unit 170. And the inverter circuit 144 comprises a plurality of circuits 150 each including an in-series connected upper arm and lower arm (in the example shown in FIG. 2, three circuits 150 of in-series connected upper arm and lower arm), with each of these upper arm including an IGBT (Insulated Gate type Bipolar Transistor) 328 and a diode 156 and operating as an upper arm, and each of these lower arm including an IGBT (Insulated Gate type Bipolar Transistor) 330 and a diode 166 and operating as a lower arm; and the midway point of each of the upper and lower arm series circuits 150, i.e. the intermediate electrode 169, is connected via an AC terminal 159 to an AC power line (i.e. an AC bus bar) 186, thus being connected via the AC power line 186 to the motor-generator 192. The control unit 170 includes a driver circuit 174 that controls the operation of the inverter circuit 144, and a control circuit 172 that supplies a control signal to the driver circuit 174 via a signal line 176.

The IGBTs 328 and 330 in the upper and lower arms are semiconductor elements for power switching, and are operated by drive signals from the control unit 170 so as to convert DC power supplied from the battery 136 into three phase AC power. This power that has been converted is supplied to the armature windings of the motor-generator 192.

The inverter circuit 144 is built as a three phase bridge circuit in which the upper and lower arm series circuits 150 for each of three phases are electrically connected in parallel between a DC positive terminal 314 and a DC negative terminal 316, and the DC positive terminal 314 and the DC negative terminal 316 are respectively connected to the positive electrode side and the negative electrode side of the battery 136.

The present embodiment exemplifies usage of the IGBTs 328 and 330 as power semiconductors for switching. The IGBTs 328 and 330 have respective collector electrodes 153 and 163, emitter electrodes (emitter electrode terminals 155 and 165 for signals), and gate electrodes (gate electrode terminals 154 and 164). Diodes 156 and 166 are electrically connected respectively between the collector electrode 153 and 163 of the IGBTs 328 and 330 and their emitter electrodes, as shown in the figure. Each of the diodes 156 and 166 has two electrodes, a cathode electrode and an anode electrode, and their cathode electrodes are electrically connected respectively to the collector electrode sides of the IGBTs 328 and 330 while their anode electrodes are electrically connected to the emitter electrodes of the IGBTs 328 and 330, so that the forward directions of the diodes 156 and 166 are respectively in the directions from the emitter electrode sides of the IGBTs 328 and 330 towards their collector electrode sides. While, in this first embodiment, an example is shown in which the IGBTs 328 and 330 are used as the semiconductor elements for power switching, it would also be acceptable to use MOSFETs (Metallic Oxide Semiconductor type Field Effect Transistors) as these switching elements for power switching. In such a case, the diodes 156 and 166 would not be required.

The upper and lower arm series circuits 150 are provided for each of three phases, corresponding to each of the three phase armature windings of the motor-generator 192. The three upper arm and the three lower arm series circuits 150 are connected respectively to the U-phase, the V-phase, or the W-phase of the motor generator 192, respectively via AC terminals 159 from intermediate electrode 169$s$, to which the emitter electrodes of the IGBTs (in the case of upper arm IGBTs 328) or the collector electrodes 163 of the IGBTs (in the case of lower arm IGBTs 330) are connected. The upper and lower arm series circuits 150 are connected in parallel. The collector electrodes 153 of the upper arm IGBTs 328 are each electrically connected (i.e. are connected via the DC bus bars) to the positive electrode side capacitor electrode 506 of the capacitor module 500 via the positive terminals 157 (i.e. the P terminals), while the emitter electrodes of the lower arm IGBTs 330 are each electrically connected to the negative electrode side capacitor electrode 504 of the capacitor module 500 via the negative terminals 158 (i.e. the N terminals). The intermediate electrodes 169 at the connection portions between the emitter electrodes of the upper arm IGBTs 328 and the collector electrodes of the lower arm IGBTs 330 are electrically connected to the armature windings of the motor-generator 192 of the corresponding phases via an AC connector 188.

The capacitor module 500 acts as a smoothing circuit for suppressing fluctuations of the DC voltage generated by the switching operation of the IGBTs 328 and 330. Via DC connectors 138, the positive electrode side of the battery 136 is connected to the positive electrode side capacitor electrode 506 of the capacitor module 500, while the negative electrode side of the battery 136 is connected to the negative electrode side capacitor electrode 504 of the capacitor module 500. Due to this, the capacitor module 500 is connected to the line between the collector electrodes 153 of the upper arm IGBTs 328 and the positive electrode side of the battery 136, and to the line between the emitter electrodes of the lower arm IGBTs 330 and the negative electrode side of the battery 136, and thus is electrically in parallel connected to the battery 136 and the upper and lower arm series circuits 150.

The control unit 170 is a circuit for operating the IGBTs 328 and 330, and includes a control circuit 172 that generates timing signals for controlling the timings of switching of the IGBTs 328 and 330 on the basis of information that is inputted from other control devices or sensors or the like, and a driver circuit 174 that generates a drive signal for causing the switching operations of the IGBTs 328 and 330 on the basis of these timing signals outputted from the control circuit 172.

The control circuit 172 includes a microcomputer (not shown in the figures) for performing processing for calculating the switching timings for the IGBTs 328 and 330. As input information, a target torque value that is requested for the motor-generator 192, values of currents being supplied to the armature windings of the motor-generator 192 from the upper and lower arm series circuits 150, and the position of the magnetic poles of the rotor of the motor-generator 192, are inputted to this microcomputer. The target torque value is a value based upon a command signal outputted from a higher level control device not shown in the figures, and the current values are values that are determined on the basis of a detection signal outputted from a current sensor 180. Moreover, the magnetic pole position is a value that is determined on the basis of a detection signal outputted from a rotating magnetic pole sensor not shown in the figures that is provided to the motor-generator 192. While in this first embodiment an example is described in which the AC current value for each of the three phases is detected, it would also be acceptable to arrange only to detect AC current values for two of the phases.

The microcomputer (not shown) incorporated in the control circuit 172 calculates current command values for the d-q axes of the motor-generator 192 on the basis of the target torque value, then calculates voltage command values for the d-q axes on the basis of the differences between the current command values for the d-q axes that are the result of the above calculation and the current values for the d-q axes that have been detected, and then converts these voltage command values for the d-q axis to voltage command values for the U-phase, the V-phase, and the W-phase on the basis of the magnetic pole position that has been detected. And modulated pulsed waves are generated by comparing together fundamental waves (sine waves) based upon these voltage command values for the U phase, the V phase, and the W phase and carrier waves (triangular waves), and these modulated pulsed waves are outputted to the driver circuit 174 as PWM (Pulse Width Modulation) signals.

When driving the lower arm, the driver circuit 174 amplifies the PWM signal described above and outputs it as a drive signal to the gate electrode of the corresponding IGBT 330 of the lower arm. Furthermore, when driving the upper arm, it amplifies the PWM signal after having shifted the level of the reference potential of the PWM signal to the level of the reference potential of the upper arm, and outputs it as a drive signal to the gate electrode of the corresponding IGBT 328 of the upper arm. Due to this, each of the IGBTs 328 and 330 performs switching operation on the basis of the drive signal that is inputted.

The control unit 170 performs detection of anomalies such as excess current, excess voltage, excess temperature and so on, and thereby protects the upper and lower arm series circuits 150. For this purpose, sensing information is inputted to the control unit 170. For example, information about the current that flows in the emitter electrode of each of the IGBTs 328 and 330 is inputted from the emitter electrode terminals 155 and 165 for monitoring of each arm to the corresponding drive unit IC (not shown in the figure). Based upon this, each of the drive unit ICs performs excess current detection, and, if it has detected excess current, stops the switching operation of the corresponding IGBT 328 or 330, thus protecting the corresponding IGBT 328 or 330 from excessive current. Furthermore, information about the temperatures of the upper and lower arm series circuits 150 is inputted to the microcomputer from temperature sensors (not shown in the figures) that are provided to the upper and lower arm series circuits 150. Yet further, information about the voltage at the DC positive electrode side of the upper and lower arm series circuits 150 is inputted to the microcomputer. The microcomputer performs excess temperature detection and excess voltage detection on the basis of such information, and, if it detects excess temperature or excess voltage, stops the switching operation of all of the IGBTs 328 and 330, thus protecting the upper and lower arm series circuits 150, and also the semiconductor modules that includes these circuits 150, from excess temperature and excess voltage.

The operation of the IGBTs 328 and 330 of the upper and lower arms of the inverter circuit 144 is changed over in a fixed order, and the current in the fixed windings of the motor-generator 192 during this changeover flows in the circuits constituted by the diodes 156 and 166.

As shown in the figure, the upper and lower arm series circuits 150 have: positive terminals (P terminals) 157, negative terminals (N terminals) 158, AC terminals 159 from the upper and lower arm intermediate electrodes 169, upper arm signal terminals (emitter electrode terminals for monitoring) 155, upper arm gate electrode terminals 154, lower arm signal terminals (emitter electrode terminals for monitoring) 165, and lower arm gate electrode terminals 164. Furthermore, the power conversion device 200 has the DC connector 138 at its input side and the AC connector 188 at its output side, and is connected to the battery 136 and the motor-generator 192 via the connectors 138 and 188, respectively. It should be understood that it would also be acceptable to provide power conversion devices having a circuit structure in which, for each phase, two upper and lower arm series circuits are connected in parallel, as circuits that output each phase of the three-phase AC to be outputted to the motor-generator. A discharge control circuit in the power conversion system having the above-mentioned construction is explained.

Figure 3:
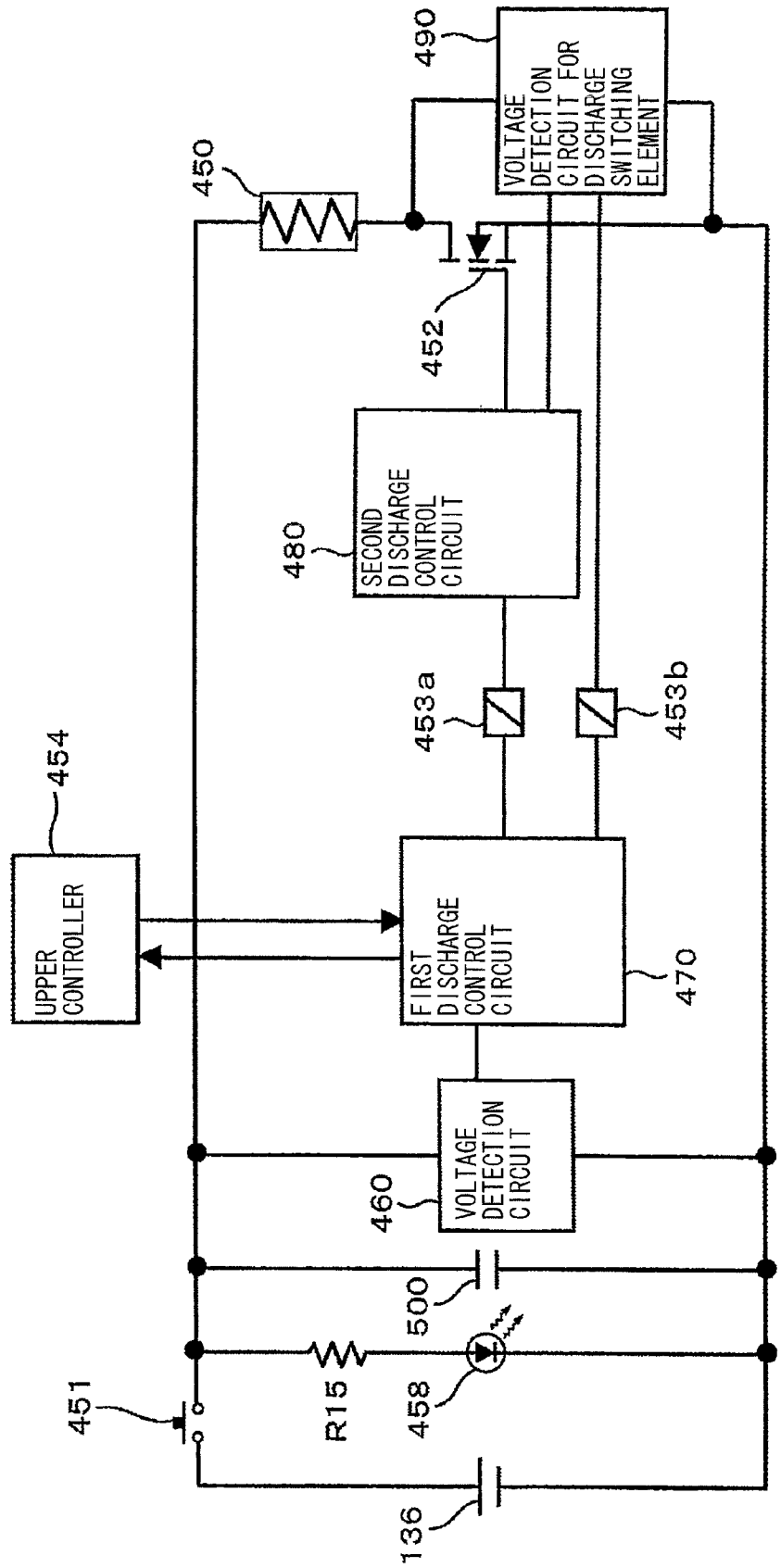
FIG. 3 presents a block diagram of a discharge control circuit in the power conversion system according to an embodiment of the present invention.

FIG. 3 presents a block diagram showing the construction of the discharge circuit according to one embodiment of the present invention. In FIG. 3, the same reference symbols are affixed to elements that are the same as elements shown in FIGS. 1 and 2, and the explanation will concentrate upon specific aspects that are different from the FIGS. 1 and 2. The battery 136 is connected to the capacitor module 500 for smoothing voltage provided in the inverter circuit in parallel and the battery 136 and the capacitor module 500 are connected via a contactor 451 provided in series therebetween to supply voltage to the inverter circuit. The ON/OFF-operation of the contactor 451 is controlled by an upper controller 454 such as an engine controller or a battery controller. For example, in an HEV, the contactor 451 is operated in response to a contactor ON/OFF signal from the upper controller 454 in association with start/stop-operation of the engine.

A first discharge control circuit 470 includes a microcomputer and detects a voltage value across both ends of the capacitor module 500 from the voltage detection circuit 460 and an active discharge signal, which is a signal that enables discharge, from the upper controller 454 and generates a first discharge signal (A_DCHG).

The voltage detection circuit 460 includes a plurality of resistors connected in series. The voltage detection circuit 460 divides the voltage between both terminals of the capacitor module 500 and outputs the divided voltage to the first discharge control circuit 470. The first discharge signal (A_DCHG) output from the first discharge control circuit 470 is input to the second discharge control circuit 480 via an insulated transmission element 453a.

The second discharge control circuit 480 includes a microcomputer and a one-shot circuit and generates a second discharge signal (DCHG_FET) based on the first discharge signal (A_DCHG). As mentioned above, the first discharge signal (A_DCHG) can be treated as a discharge signal that is hardly influenced by noises by being regenerated as a second discharge signal (DCHG_FET) through the second discharge control circuit. The second discharge signal (DCHG_FET) is a signal that controls conduction of a switching element 452 for discharge connected with the discharge resistor 450 in series. When the switching element 452 for discharging is conducted based on this signal, the capacitor module 500 and the discharge resistor 450 are electrically connected to each other. Charges accumulated in the capacitor module 500 are converted into thermal energy by the discharge resistor 450 connected in parallel to the capacitor module 500.

Between the drain and source of the switching element 452 (between the collector and the emitter in the case of a transistor) for discharging, there is provided a voltage detection circuit 490 that detects a voltage across both ends of the switching element 452 for discharging. The voltage across both the ends of the switching element 452 for discharging is output to the first discharge control circuit 470 via the insulated transmission element 453b. In the first discharge control circuit 470, this voltage value is detected by a microcomputer equipped in the circuit and whether the switching element 452 for discharge operates normally or whether the discharging is carried out without fail is determined.

LED 458 informs whether charges are stored in the capacitor module 500. The LED 458 connected in parallel to the capacitor module 500 is turned ON when the capacitor module 500 is charged to inform a maintenance operator of the possibility of electric shock. On the other hand, when the discharging of the capacitor module 500 has been completed, the LED 458 is turned OFF. Therefore, the power conversion system is provided with a means with which the state of charge/discharge of the capacitor module 500 can be confirmed by confirming the ON/OFF state of the LED.

The LED 458 is to prevent electric shock when the maintenance operator touches the power conversion system 200, so that the LED 458 should be provided at a position where the ON/OFF state of the LED 458 can be visually monitored. Therefore, the LED 458 should be provided on the surface of the power conversion system 200. It is desirable that the LED 458 is provided, in particular, in the vicinity of a DC current positive terminal 314 or a DC connector 138 where electric shock occurs most likely in the power conversion system 200.

The microcomputer provided in the first discharge control circuit outputs to the upper controller 454 the discharge state of the capacitor module 500, for example, as to whether charges remain in the capacitor module 500 or the capacitor module is completely discharged, or whether the switching element 452 for discharge is conducting and during discharging from the voltage value between the terminals of the capacitor module 500 and the voltage value of the switching element 452 for discharging.

The discharge state of the capacitor module 500, of which information is obtained from the first discharge control circuit via CAN or the like, is informed to the maintenance operator by the upper controller 454 on a display of an HEV instrument panel, or the discharge state of the capacitor module 500 is indicated by utilizing turning ON of an LED provided on the power conversion system or peripheral circuits thereof.

First Embodiment

Figure 4:
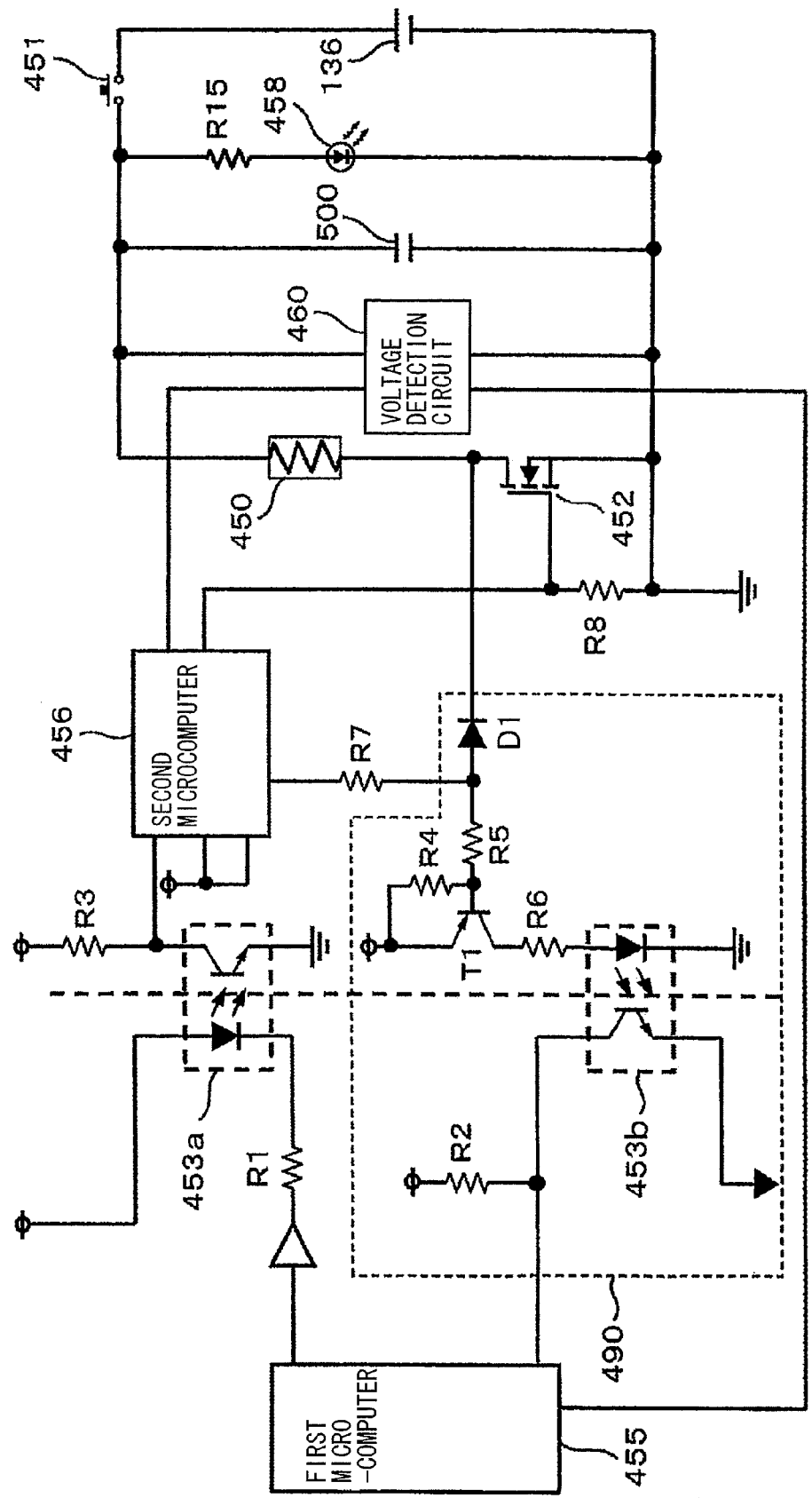
FIG. 4 presents a circuit diagram showing a first exemplary embodiment of the present invention.

FIG. 4 shows a circuitry according to a first embodiment of the present invention.

In FIG. 4, the first discharge control circuit 470 includes a first microcomputer 455 and detects and generates a first discharge command signal (A_DCHG) based on the voltage between both terminals of the capacitor module 500 detected by the voltage detection circuit 460. The first discharge command signal (A_DCHG) is input to the second microcomputer 456 provided in the second discharge control circuit 480 through the insulated transmission element 453a such as a photocoupler.

The second microcomputer 456 generates a second discharge command signal (DCHG_FET) based on a rising edge or a falling edge of the first discharge signal (A_DCHG). According to the method of generating a discharge signal as mentioned above, when the first microcomputer 455 is in failure or erroneously operates at the time of, for example, the contactor welding, a second discharge command signal (DCHG_FET) is output from the second microcomputer 456 based on the rising edge or falling edge of the first discharge command signal (A_DCHG) even though the first discharge command signal (A_DCHG) is affixed to H or L. Therefore, the discharge to the discharge resistor 450 can be stopped to prevent burn out of the discharge resistor 450.

The switching element 452 for discharge turns to be conducting based on the second discharge command signal (DCHG_FET) and the charge stored in the capacitor module 500 is discharged by the discharge resistor 450 connected thereto in series.

The voltage detection circuit 490 for switching element for discharge includes a transistor T1, a diode D1, and resistors R4, R5, and R6. When performing discharge, the switching element 452 for discharge is turned ON to detect the voltage across both ends of the switching element for discharging and turn the transistor T1 ON, so that the insulated transmission element 453b connected to the transistor T1 in series is also turned ON, so that a signal of L state is input to the first microcomputer 455.

On the other hand, when no discharging is performed, the switching element 452 for discharging is OFF, so that the transistor T1 and the insulated transmission element 453b are also turned OFF. Therefore, a signal of H state obtained by pulling up to the voltage of power source of the first discharge control circuit 470 by means of the resistor R2 is input to the first microcomputer 455. It can be determined whether discharging is normally carried out based on whether the signal is H or L.

Further, the first microcomputer 455 compares a first discharge command signal output from the first microcomputer 455 with a signal from the voltage detection circuit 490 for the switching element for discharging and the result can be utilized for detecting failure of the switching element 452 for discharging.

Further, similarly to the first microcomputer 455, the second microcomputer 456 has a detection function to detect a detection voltage from the voltage detection circuit 460 and a detection voltage from the voltage detection circuit 490 for the switching element for discharging. With this construction, discharging can be carried out by generating an second discharge command signal (DCHG_FET) independently by the second microcomputer 456 alone. However, in this case, there must be adopted a circuit construction in which the circuit of the second discharge control circuit 480 at high voltage and the circuit of the upper controller 454 at low voltage are insulated from each other by using an insulated transmission element similar to the insulated transmission element 453a for transmitting and receiving an active discharge signal between the second microcomputer 456 and the upper controller 454.

Second Embodiment

Figure 5:
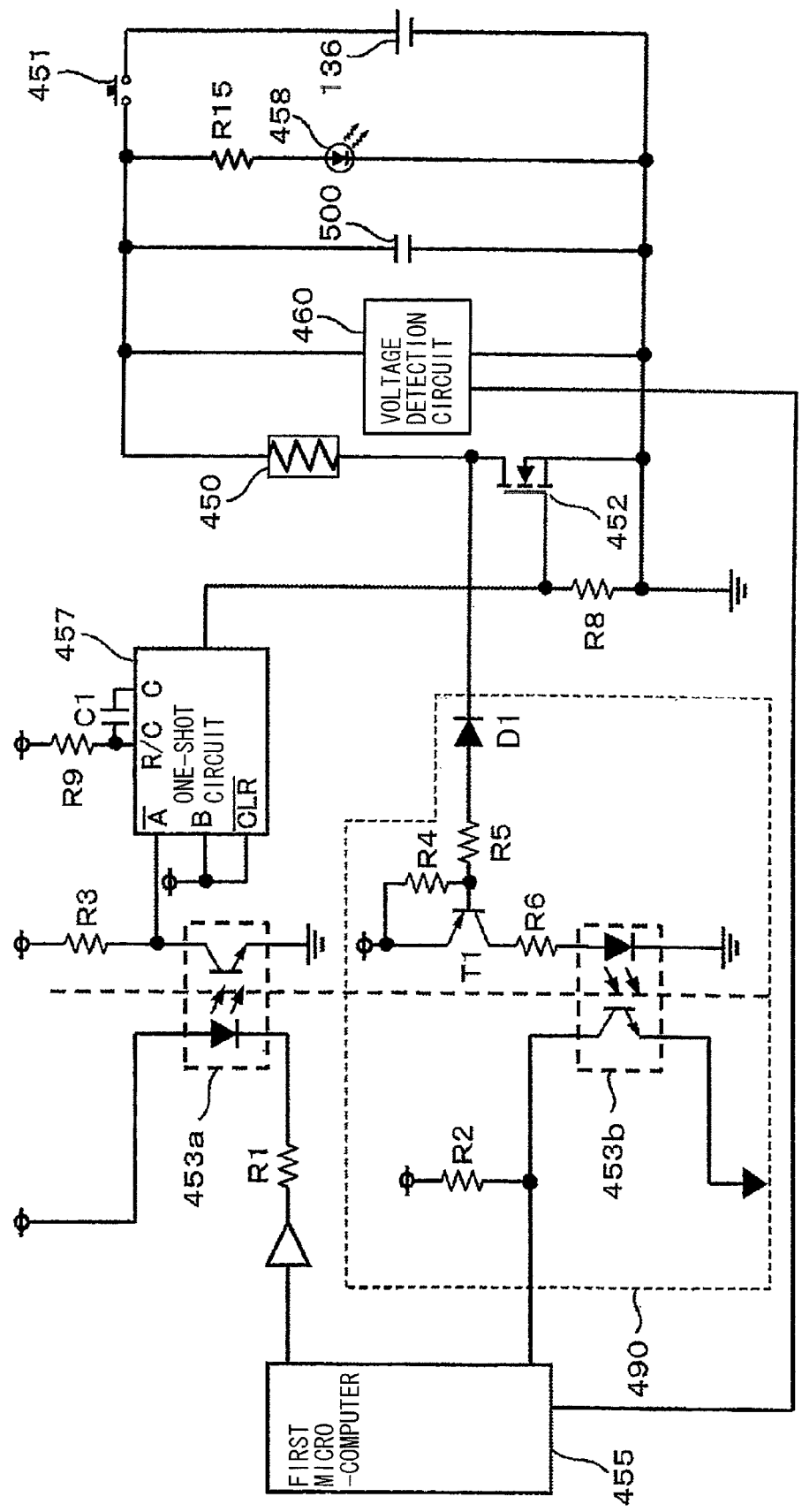
FIG. 5 presents a circuit diagram showing a second exemplary embodiment of the present invention.

FIG. 5 shows the circuit construction of the power conversion system according to a second embodiment of the present invention. The power conversion system according to the second embodiment corresponds to a circuit which is obtained by using a one-shot IC 457 instead of the second microcomputer 456 and basic circuit operations are as explained with respect to the first embodiment shown in FIG. 4. Differences of the present embodiment from the first embodiment are explained hereafter.

The first discharge command signal (A_DCHG) output from the first microcomputer 455 is input to the one-shot IC 457 through an insulated amplifier circuit, for example, the insulated transmission element 453a. In the one-shot IC 457, a second discharge command signal (DCHG_FET) having a predetermined pulse width is generated based the rising edge or falling edge of the input signal. According to the method of generating a discharge signal as mentioned above, when the first microcomputer 455 is in failure or erroneously operates at the time of, for example, welding the contactor, a second discharge command signal (DCHG_FET) is output from the one-shot IC 457 based on the rising edge or falling edge of the first discharge command signal (A_DCHG) even though the first discharge command signal (A_DCHG) is fixed to H or L. Therefore, the discharging through the discharge resistor 450 can be stopped to prevent burn out of the discharge resistor 450. In this case, the second discharge control circuit 480 can be made to have a circuit construction that is at low cost and simple while retaining the function of preventing burn out of the discharge resistor when the first microcomputer 455 is in failure or erroneously operating.

Figure 6:
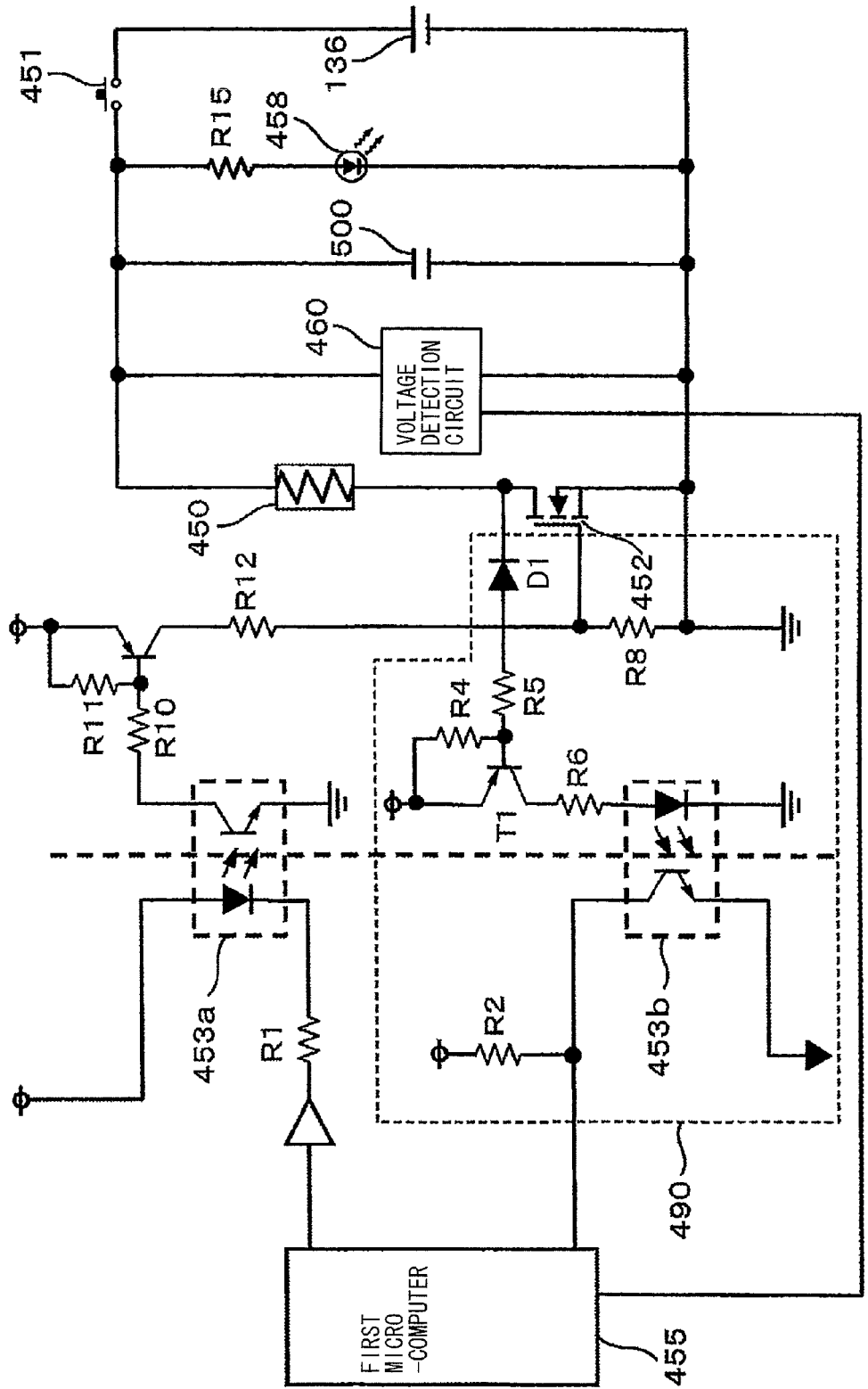
FIG. 6 presents a circuit diagram showing a conventional construction that has no second discharge control circuit of an embodiment according to the present invention.

FIG. 6 shows a conventional discharge circuit construction which differs from the circuit construction according to the present embodiment. The differences from the embodiments shown in FIG. 4 or FIG. 5 will be described later.

Figure 7:
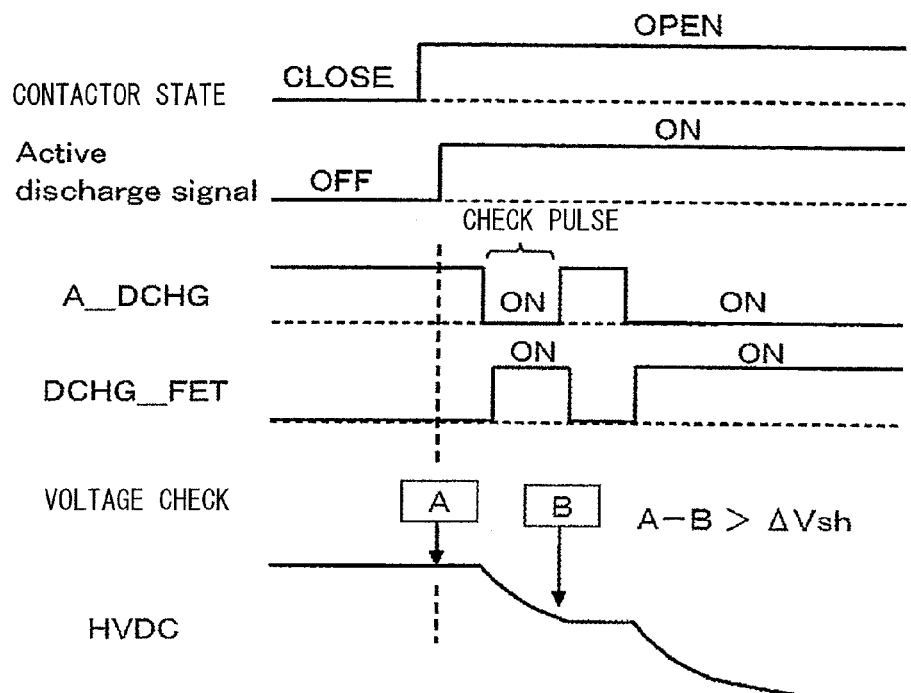
FIG. 7 presents timing charts of various signals when a normal discharging is carried out in an embodiment of the present invention.
Figure 7:
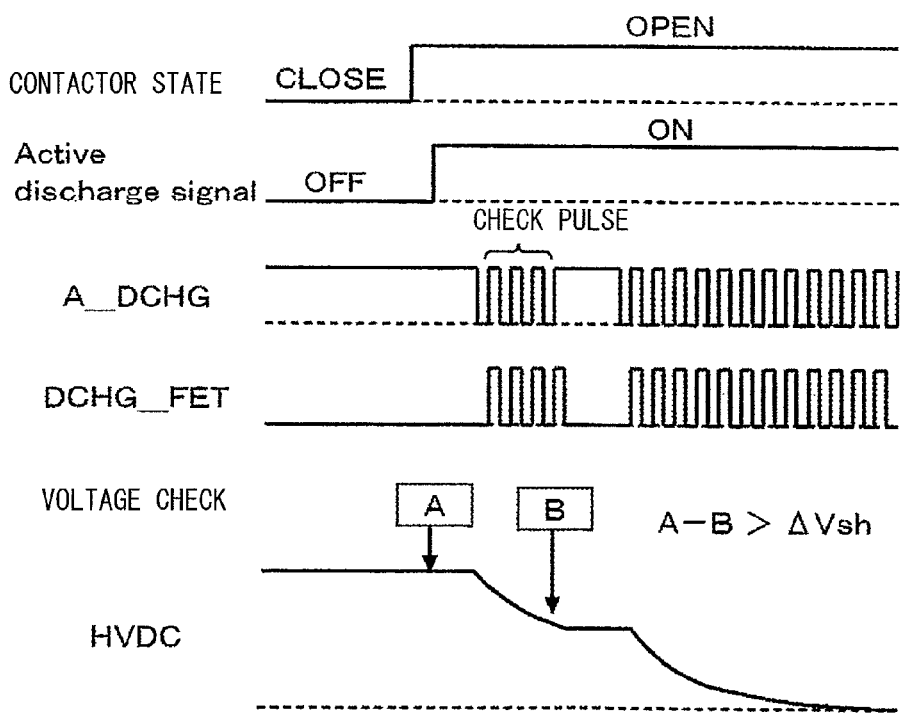

FIG. 7(a) presents a timing chart illustrating each signal when normal operation is performed in the present embodiment. Normal discharging of the charge stored in the capacitor module 500 is performed in a state in which the contactor 451 is turned OPEN and discontinuous from the battery 136 connected in parallel thereto.

The first discharge control circuit 470 receives active discharge signal ON from the upper controller 454 and outputs a check pulse for a certain period as the first discharge command signal (A_DCHG). The first discharge control circuit 470 detects the voltage between both terminals of the capacitor module 500 at that point in time (A) by the voltage detection circuit 460 and stores the voltage value between both terminals of the capacitor module 500. The check pulse of the first discharge command signal (A_DCHG) output form the first discharge control circuit 470 is input to the second discharge control circuit 480 via the insulated transmission element 453a.

The second discharge control circuit 480 generates a second discharge command signal (DCHG_FET) by the second microcomputer 456 or the one-shot IC 457 based on the input first discharge command signal (A_DCHG). The charge stored in the capacitor module 500 is discharged when the switching element 452 for discharge is turned conducting based on the second discharge command signal (DCHG_FET) output from the second discharge control circuit 480 to connect the discharge resistor 450 in series to the switching element 452 for discharge. After discharging (preliminary discharging) is carried out only for a check pulse period, for a predetermined period, the voltage between both terminals of the capacitor module 500 is detected by a voltage detection circuit 460 immediately after output of the check pulse (B).

The first microcomputer 455 provided in the first discharge control circuit 470 calculates a difference between a detected voltage value at time (A) and a detected voltage value at time (B) to obtain a voltage difference ΔV of (A)−(B), and when the voltage difference ΔV is greater than the predetermined voltage drop value (ΔV>ΔVsh), it is determined that the contactor is OPEN and main discharging is carried out.

Figure 8:
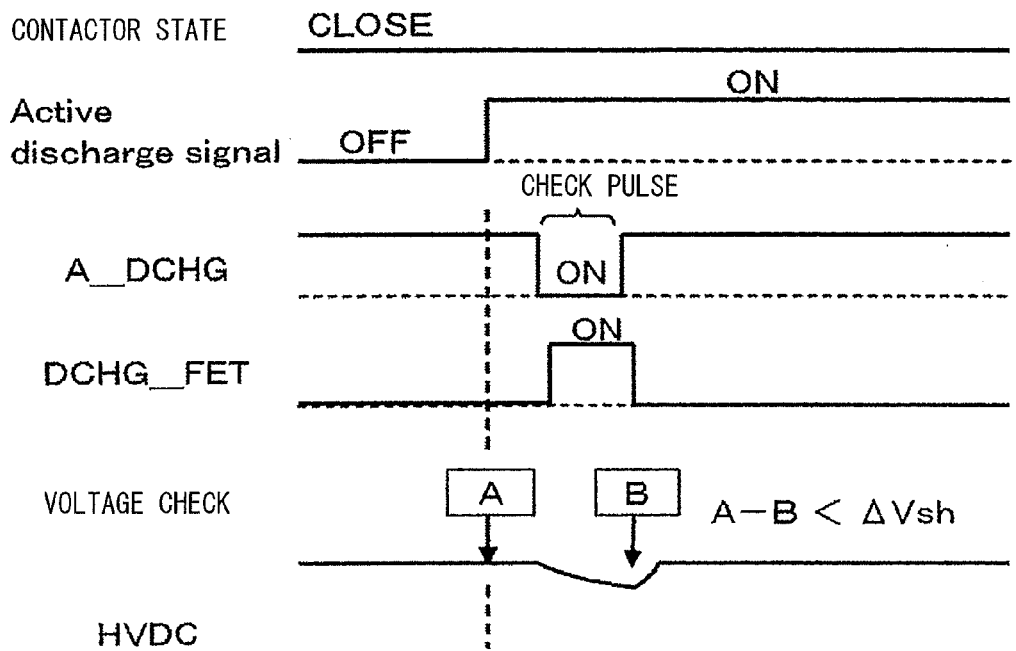
FIG. 8 presents timing charts of various signals when the contactor is out of order in an embodiment of the present invention.
Figure 8:
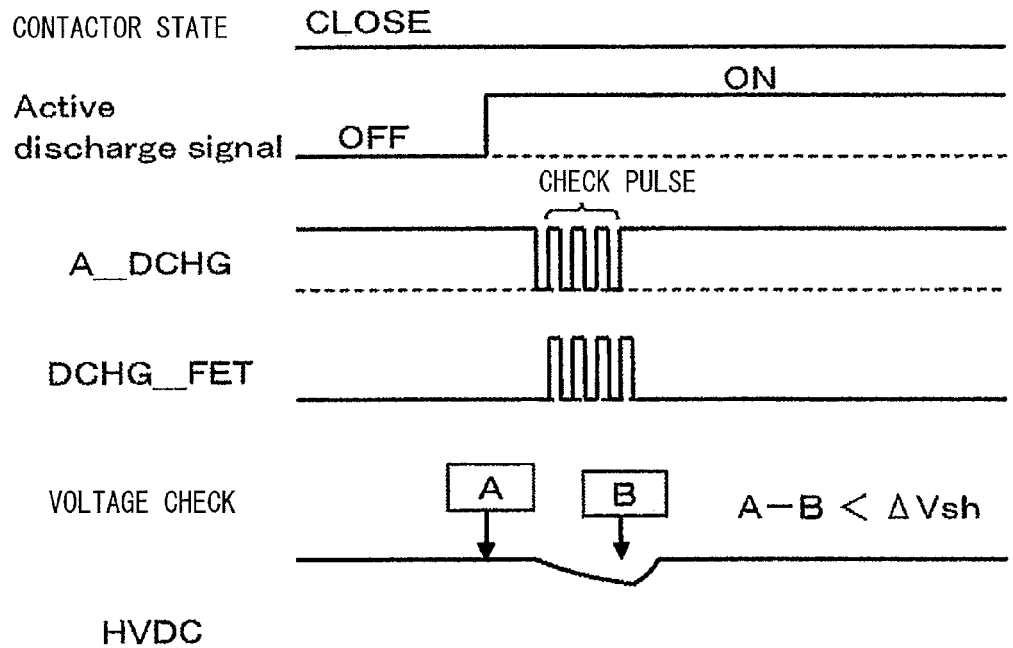

FIG. 8(a) presents a timing chart showing each signal in the present invention when the contactor is abnormal. Similarly to the normal discharging shown in FIG. 7(a), discharging with check pulse is carried out. The first microcomputer 455 equipped in the first discharge control circuit 470 compares the voltage difference ΔV with the predetermined voltage drop value ΔVsh. When comparison calculation results in ΔV<ΔVsh, for example in a case when the contactor 451 is welded, it is determined that the contactor 451 is in a CLOSE state, and the main discharging is not carried out. Therefore, discharging when the contactor 451 is welded can be prevented from carrying out.

The timing charts shown in FIG. 7(b) and FIG. 8(b) correspond to examples when the first discharge command signal (A_DCHG) and the second discharge command signal (DCHG_FET) are generated in the form of pulses having short duties. By using a microcomputer in the first discharge control circuit 470 or the second discharge control circuit, the pulse widths of the first discharge command signal (A_DCHG) and the second discharge command signal (DCHG_FET) can be freely varied by setting parameters on related software in the microcomputer. As a result, each discharge command signal can be output in the form of a pulse having a short duty, so that discharged power per pulse of discharge command signal can be decreased. That is, heat generation of the discharge resistor 450 can be suppressed by carrying out discharging little by little with discharge command signals in the form of pulses having short duty durations. Therefore, if it is not necessary to take care of discharging time length, it is possible to use a discharge resistor 450 having a small rated power and a small volume by repeating stepwise short discharging together with suppressing heat generation of the discharge resistor 450 as much as possible, so that the power conversion system can be down-sized.

Figure 9:
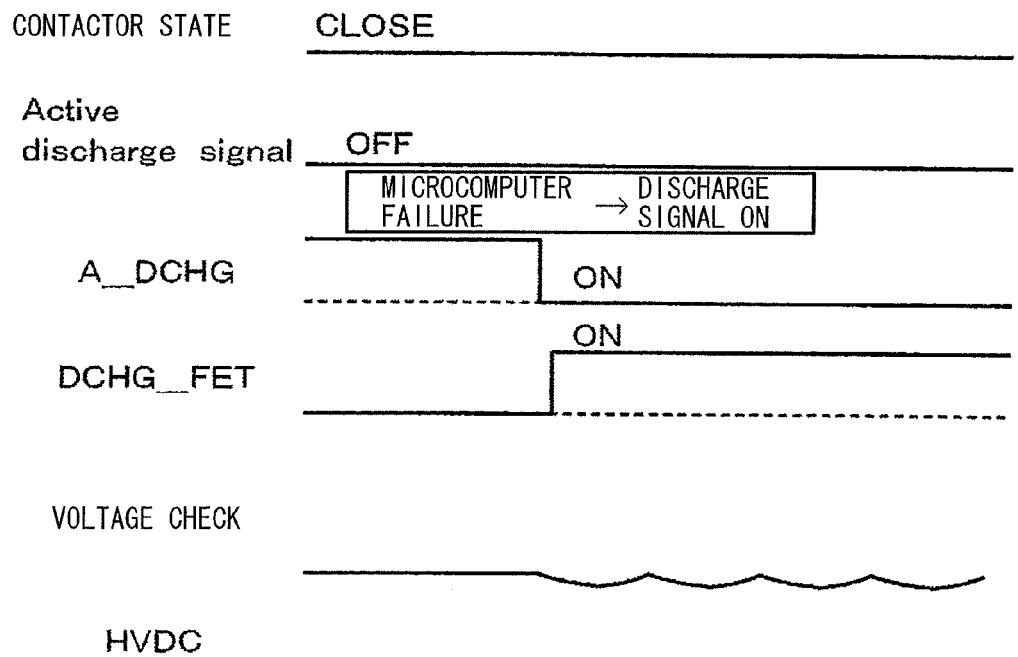
FIG. 9 presents timing charts of various signals when the first discharge control circuit is out of order in an embodiment of the present invention.
Figure 9:
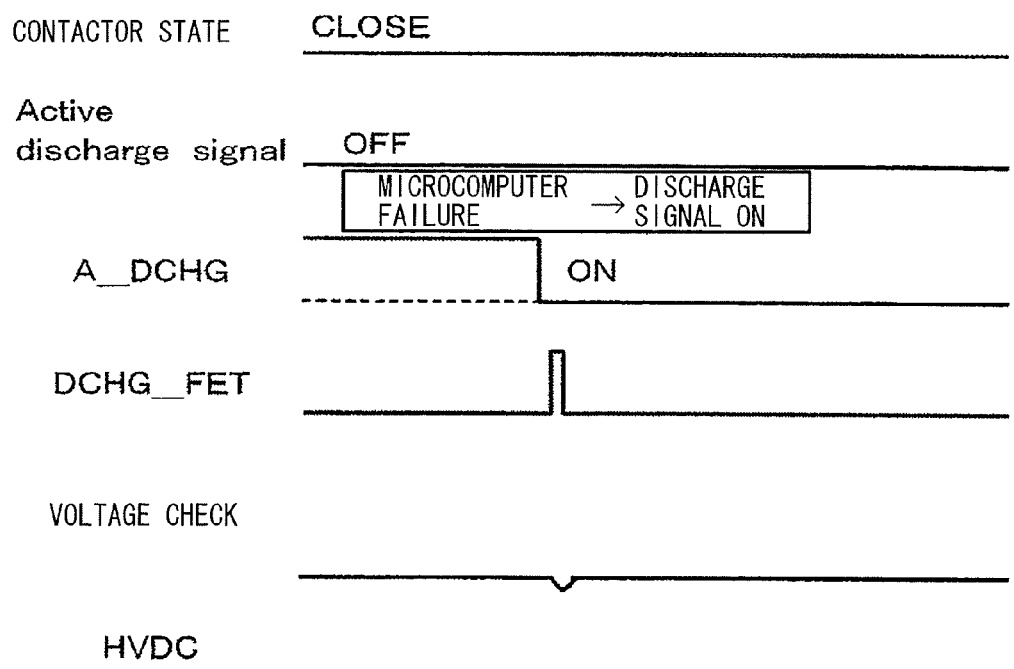

FIGS. 9(a) and 9(b) respectively present a timing chart illustrating each signal in the conventional circuit that is not equipped with the circuit according to the present embodiment when the first discharge control circuit is in an abnormal state, and a timing chart illustrating each signal in a circuit that is equipped with the circuit according to the present invention for comparison. For example, FIGS. 9(a) and 9(b) relate to a situation where the contactor 451 is in a CLOSE state and the active discharge signal from the upper controller 454 is OFF, and the first discharge command signal (A_DCHG) is fixed to H or L by a failure or erroneous operation of the first microcomputer 455.

In the conventional circuit, the first discharge command signal (A_DCHG) is inverted to form as such the second discharge command signal (DCHG_FET) and hence it is possible that when the first discharge command signal (A_DCHG) is always ON as the active discharge signal, discharging is performed even when the contactor is in a CLOSE state, resulting in burn out of the discharge resistor 450.

On the other hand, in the discharge circuit in the power conversion system according to the present embodiment, the second discharge command signal (DCHG_FET) is generated by an edge of the first discharge command signal (A_DCHG). As a result, even when the first discharge command signal (A_DCHG) is output always in a state of ON, due to failure or erroneous operation of the first microcomputer 455, the output second discharge command signal (DCHG_FET) is a discharge command pulse having a short duration, so that the burn out of the discharge resistor 450 can be prevented.

Further, similarly to the first microcomputer 455, the second microcomputer 456 has a function of monitoring a detected voltage from the voltage detection circuit 460 and a detected voltage from the voltage detection circuit 490 for the switching element for discharging, so that the second microcomputer 456 by itself can independently generate a second discharge command signal (DCHG_FET) to carry out discharging.

In this case, however, it is necessary as mentioned above to use an insulated transmission element similar to the insulated transmission element 453a to insulate the second discharge control circuit 480 at a high voltage and the circuit of the upper controller 454 at a low voltage from each other in transmitting and receiving active discharge signal between the second microcomputer 456 and the upper controller 454.

Figure 10:
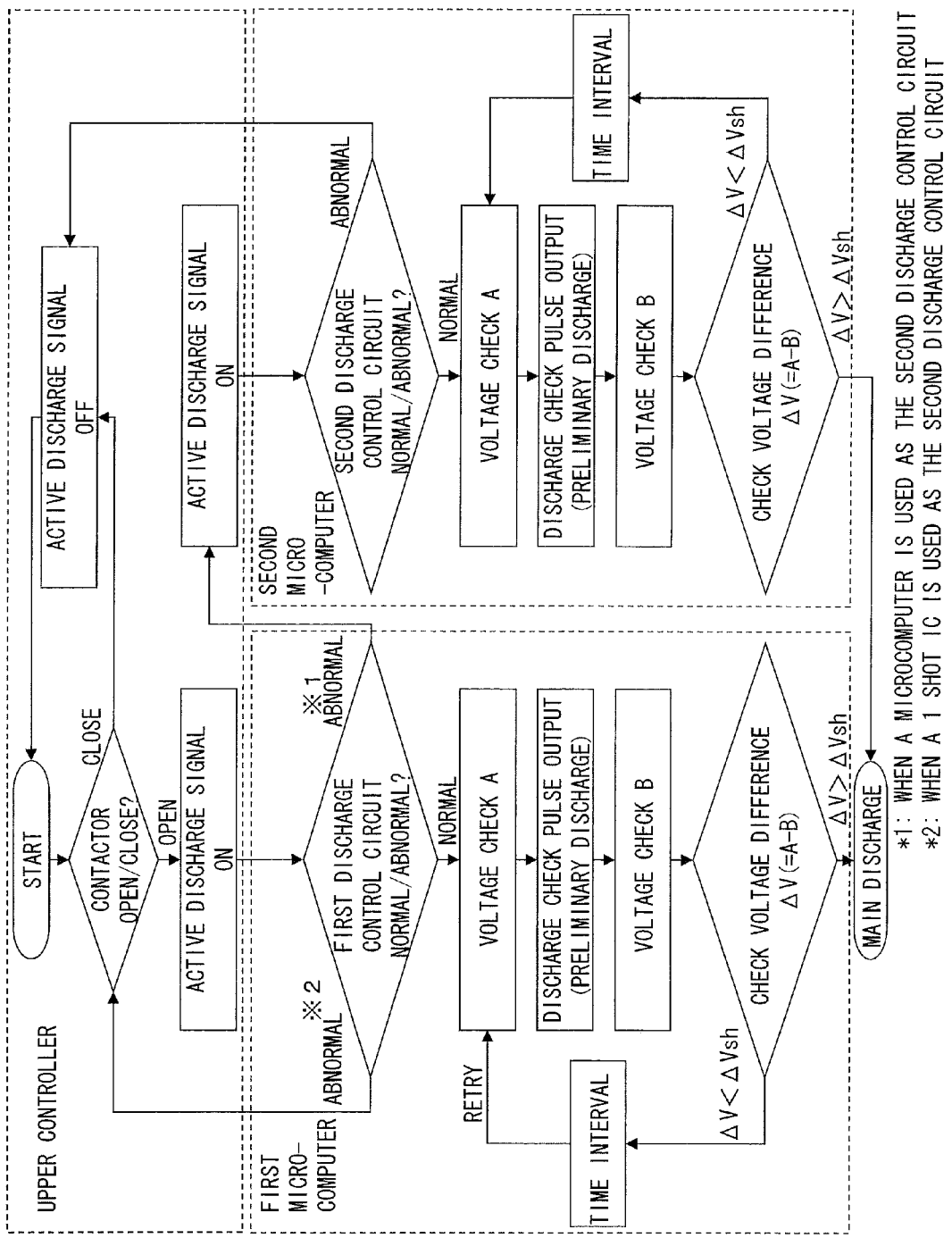
FIG. 10 presents a flowchart of discharge operation in an embodiment of the present invention.

FIG. 10 presents a flowchart illustrating discharge operation in the present embodiment. The upper controller 454 controls an switch command signal to switch the contactor 451 to the first discharge control circuit 470 or the second discharge control circuit 480 and the active discharge signal of the switching element 452 for discharging. When discharging is carried out, the upper controller 454 controls the contactor 451 to be in an OPEN state, and then outputs an active discharge signal to the first discharge control circuit 470. However, when the contactor 451 is in a CLOSE state, no active discharge signal is output and is OFF, so that the discharge operation flow returns to START.

The first discharge control circuit 470 performs checking operation of its own circuit based on the input active discharge signal. When it is determined that the operation of the first discharge control circuit 470 is normal, voltage check A is performed by the voltage detection circuit 460 to detect a voltage between both terminals of the capacitor module 500 at time A and stores the detected voltage value. On the other hand, when it is determined that the operation of the first discharge control circuit 470 is abnormal, the first discharge control circuit 470 transmits an abnormal determination signal to the upper controller 454.

When the first discharge control circuit 470 is determined to be in an abnormal state, if the second discharge control circuit 480 includes a second microcomputer 456 in the circuitry, the active discharge signal from the upper controller 454 is output to the second discharge control circuit 480. In the construction in which the second discharge control circuit 480 includes one-shot IC 457 or the like, it outputs only an abnormality determination signal to the upper controller 454 and its operation circulates in a determination loop for determining OPEN/CLOSE of the contactor.

After the first discharge control circuit 470 is determined to be normal and the voltage check A is performed, the first discharge control circuit 470 outputs a discharge check pulse to perform preliminary discharge. The first microcomputer 455 equipped in the first discharge control circuit 470 detects with the voltage detection circuit 460 a voltage between both terminals of the capacitor module 500 at time B immediately after the preliminary discharging has been carried out. The first microcomputer 455 calculates a voltage difference ΔV between voltages detected at times A and B. When the voltage difference ΔV is equal to or greater than the predetermined voltage threshold value, the main discharging is carried out. On the other hand, when the calculated voltage difference ΔV is equal to or less than the voltage threshold ΔVsh, the discharge operation flow is carried out again starting from the voltage check after a predetermined time interval elapsed.

The discharge operation flow for the second discharge control circuit, when discharging is carried out by the second discharge control circuit 480 in a case that the first discharge circuit is in an abnormal state, is similar to the above mentioned discharge operation flow for the first discharge control circuit 470. After the active discharge signal is received from the upper controller 454, the voltage between both terminals of the capacitor module 500 is detected by the voltage check A and preliminary discharging is carried out according to the discharge check pulse. After the preliminary discharging, the voltage check B is performed, and a voltage difference ΔV between the detected voltages is calculated. The calculated voltage difference ΔV is compared with the voltage threshold value ΔVsh, and main discharging is performed.

According to the present embodiment, there can be provided an inverter control device that can prevent the burn out of the discharge resistor due to failure of the discharge control circuit or due to erroneous discharge signal in a state where the contactor is closed and enables improvement of reliability. Since the discharge signal is variable, discharging time can be adjusted. In addition, if it is not necessary to take care of discharging time length, discharge resistors having low rating can be used, so that a down-sized inverter control device can be provided.

Although various embodiments and variations have been explained above, the present invention is not limited thereto. Other embodiments and variations that are conceivable within the range of technical concept of the present invention are also included in the scope of the present invention.

The disclosure of the following priority application is herein incorporated by reference: Japanese Patent Application No. 2009-048718 filed Mar. 3, 2009.

The invention claimed is:

1. A power conversion system comprising:
    an inverter circuit unit that converts a direct current power supplied from a direct current source into an alternating current power, the direct current power being supplied to the inverter circuit through a contactor that conducts and interrupts the direct current;
    a capacitor that smoothes the direct current power;
    a voltage detection circuit unit that detects voltage between both terminals of the capacitor;
    a discharge circuit unit that is connected to the capacitor in parallel, and that includes a discharge resistor for discharging a charge stored in the capacitor and a switching element for discharging the voltage detection circuit unit which detects voltage between both terminals of the switching element, being connected in series to the discharge resistor;
    a first discharge control circuit that includes a microcomputer that outputs a control signal to control switching of the switching element for discharging, based on a voltage value of the voltage detected by the voltage detecting circuit unit and a discharge signal output from another control unit to start discharging; and
    a second discharge control circuit that includes a signal output circuit that outputs a conduction command signal to achieve conduction of the switching element for discharging for a predetermined period and an interruption command signal to interrupt the conduction of the switching element for discharging after the conduction for the predetermined period, based on the control signal received from the first discharge control circuit via an insulated transmission element, wherein:
    after the first discharge control circuit is determined to be in an abnormal state,
        the second discharge control circuit receives the detected voltage from the voltage detection circuit unit, the detected voltage from the switching element for discharging the voltage detection circuit unit, and an active discharge signal outputted from the other control unit via the insulated transmission element, and
        the signal output circuit outputs the conduction command signal and the interruption command signal based on the detected voltage from the voltage detection circuit unit, the detected voltage from the switching element for discharging the voltage detection circuit unit, and the active discharge signal.

2. A power conversion system according to claim 1, wherein
    the control signal output by the first discharge control circuit is a control signal that has a rising edge and a falling edge, and
    the second discharge control circuit outputs the conduction command signal or the interruption command signal corresponding to the rising edge and the falling edge, respectively.

3. A power conversion system according to claim 1, wherein
    the control signal output by the first discharge control circuit is a control signal that has a high level signal and a low level signal, and
    the second discharge control circuit outputs the conduction command signal or the interruption command signal corresponding to the high level signal and the low level signal, respectively.

4. A power conversion system according to claim 1, wherein
    the first discharge control circuit and the second discharge control circuit are insulated from each other with the insulated transmission element.

5. A power conversion system according to claim 4, wherein
    the second discharge control circuit controls a pulse width of the control signal generated by the first discharge control circuit and a pulse width of a second control signal generated by the second discharge control circuit.

6. A power conversion system according to claim 5, further comprising:
- a direct current source terminal that is supplied with direct current power from the direct current source and supplies the direct current power to the inverter circuit unit; and
- an alternating current output terminal that is supplied with the alternating current power from the inverter circuit unit, wherein
- the informing circuit includes a light emitting device and arranged on a side that is closer to the direct current source terminal than the alternating current output terminal.

7. A power conversion system according to claim 1, wherein
- the second discharge control circuit includes a circuit equipped with a microcomputer.

8. A power conversion system according to claim 7, wherein
- the second discharge control circuit controls a pulse width of the control signal generated by the first discharge control circuit and a pulse width of a second control signal generated by the second discharge control circuit.

9. A power conversion system according to claim 1, wherein
- the second discharge control circuit includes a circuit equipped with a one-shot circuit.

10. A power conversion system according to claim 1, further comprising:
- an informing circuit that is connected to the capacitor in parallel and that informs whether charges stored in the capacitor have been discharged.

\* \* \* \* \*